United States Patent [19]
Kitamura

[11] Patent Number: 4,799,308
[45] Date of Patent: Jan. 24, 1989

[54] AUTOMATIC TOOL CHANGER

[75] Inventor: Koichiro Kitamura, Takaoka, Japan

[73] Assignee: Kitamura Machinery Co., Ltd., Japan

[21] Appl. No.: 90,005

[22] Filed: Aug. 27, 1987

[30] Foreign Application Priority Data

Aug. 28, 1986 [JP] Japan .............................. 61-199972

[51] Int. Cl.⁴ ........................................... B23Q 3/157
[52] U.S. Cl. ..................................... 29/568; 29/26 A
[58] Field of Search ............................... 29/568, 26 A

[56] References Cited

U.S. PATENT DOCUMENTS

| 3,947,951 | 4/1976 | Jerue | 29/568 |
| 4,288,192 | 9/1981 | Geiger et al. | 29/568 |
| 4,306,350 | 12/1981 | Kielma et al. | 29/568 |
| 4,343,077 | 8/1982 | Satsh et al. | 29/568 |

FOREIGN PATENT DOCUMENTS

| 45836 | 3/1983 | Japan | 29/568 |
| 71042 | 4/1983 | Japan | 29/568 |
| 255746 | 10/1970 | U.S.S.R. | 29/568 |
| 622626 | 9/1978 | U.S.S.R. | 29/568 |

Primary Examiner—Gil Weidenfeld
Assistant Examiner—Daniel W. Howell
Attorney, Agent, or Firm—Lorusso & Loud

[57] ABSTRACT

An automatic tool changer for use in a machine tool includes a chain (1) having a plurality of tool pots (2), a plurality of tool holders (H) set in the tool pots (2) in a fixed address manner so that the tool holders (H) are returned to their original tools pots (2) after use, a spindle (39) for rotating a selected one of the tool holders (H), a transfer pot (16) placed between the chain (1) and the spindle (39) for holding the selected one of the tool holders before and after it is used at the spindle (39), a first changer (110) placed between the chain (1) and the transfer pot (16) for exchanging one of the tool holders (H) set in the tool pots (2) and the holder (H) held by the transfer pot (16), and a second changer (120) placed between the transfer pot (16) and the spindle (39) for exchanging the tool holder (H) held by the transfer pot (16) and the tool holder (H) set in the spindle (39).

8 Claims, 8 Drawing Sheets

AUTOMATIC TOOL CHANGER

BACKGROUND OF THE INVENTION

This invention relates to an automatic tool changer for use in a machine tool.

A conventional automatic tool changer includes a tool holder transfer means such as a chain. Plural tool holders are set in respective plural tool pots arranged in the chain. When a new tool holder is required to be exchanged for a used tool holder, a single changer having a swing arm is used in order to exchange directly the new holder set in the chain with the used holder set in the spindle.

On the other hand, in a conventional automatic tool changer, plural tools are selected to be used at a spindle in a so called random memory manner. If a certain tool holder is withdrawn from a tool pot for use in the spindle whereby the tool spot becomes empty, the used tool holder which has been withdrawn from the spindle is inserted in the empty tool pot. The tool holders are not returned to their original tool pots in the chain after use on the spindle.

In such a memory random type automatic tool changer, an operator can not easily check what tool holders are to be set in the many tool pots of the chain. Whenever each used tool holder is to be set in an empty tool pot, the type and address of the tool holder to be set in the specific tool pot must be memorized in a CNC unit for the purpose of its next use.

In this regard, an address fixed type automatic tool changer is preferable. Plural tool holders are returned to their original tool pots in the chain after used. The address of the tool holder does not change during operation so that it is not necessary to memorize the type of the tool holder to be set in the specific tool pot.

However, one defect of such a fixed address type automatic tool changer is that the exchange time is long. It takes a long time if a next or new tool holder in a tool pot which is far from a fixed exchange point is required to be exchanged for a used holder set in the spindle because the chain must transfer the next tool holder to the exchange point. Such a defect is increased as the number of tool holders set in the chain is increased.

SUMMARY OF THE INVENTION

The object of this invention is to provide an automatic tool changer for use in a machine tool in which a new tool holder can be quickly exchanged for a used tool holder.

According to this invention, an automatic tool changer for use in a machine tool comprises a transfer means such as a chain having a plurality of tool pots, a plurality of tool holders set in the tool pots in a fixed address manner so that the tool holders are returned to their original tool pots after use, a spindle for rotating a selected one of the tool holders for the machining purpose, a holder holding means such as a transfer pot placed between the transfer means and the spindle for temporarily holding the selected holder before and after it is used at the spindle, a first changer placed between the transfer means and the holder holding means for exchanging a new one of the tool holders set in the tool pots and a used holder held by the holder holding means, and a second changer placed between the holder holding means and the spindle for exchanging the new tool holder held by the holder holding means and the used tool holder set in the spindle.

It is preferable that the second changer includes a swing arm having a pair of pawls for holding the tool holders when they are exchanged between the transfer pot and the spindle. A shaft fixed to the swing arm has a first gear. A bar which can rotate about its axis and move in its axial direction by means of an actuation mechanism is joined to a moving block in which a second gear is fixed to the bar. The swing arm can swing with respect to the moving block. The second gear is connected to the first gear through two idle gears. The actuation mechanism includes a first cam for moving the bar in its axial direction so as to shift the swing arm and the moving block in the axial direction of the bar and a second cam for rotating the bar so as to swing the swing arm.

DESCRIPTION OF EMBODIMENTS

Figure 1:
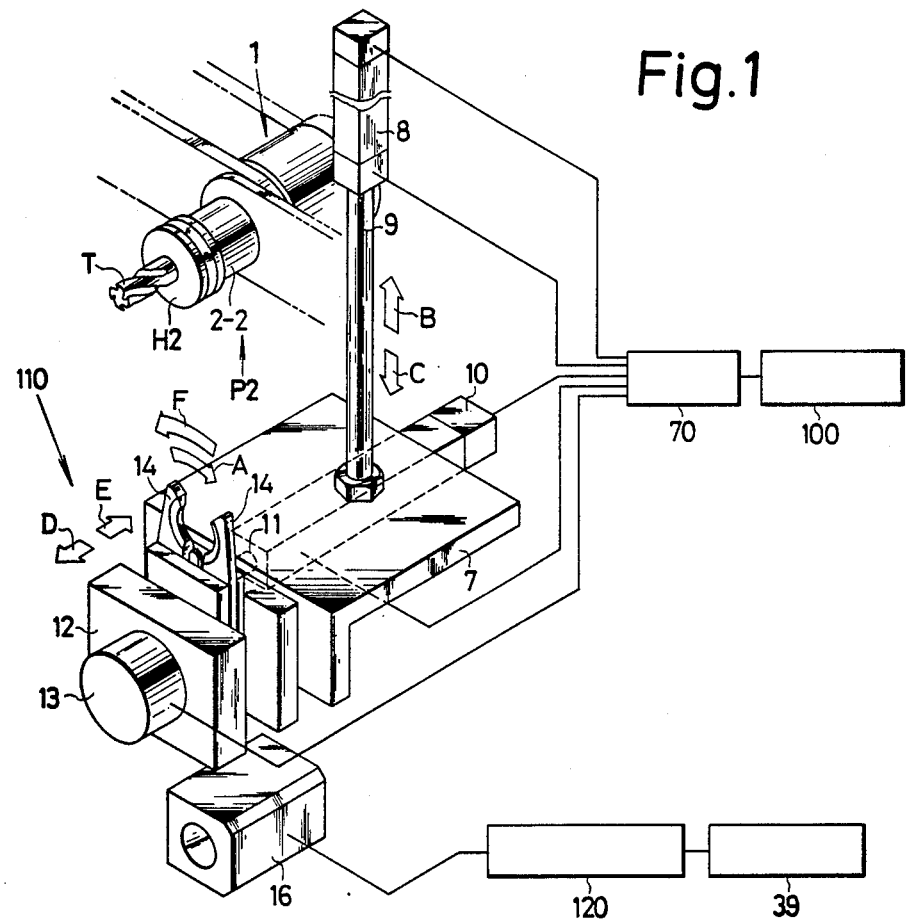
FIG. 1 is a schematic perspective view showing an automatic tool changer according to this invention.
Figure 2:
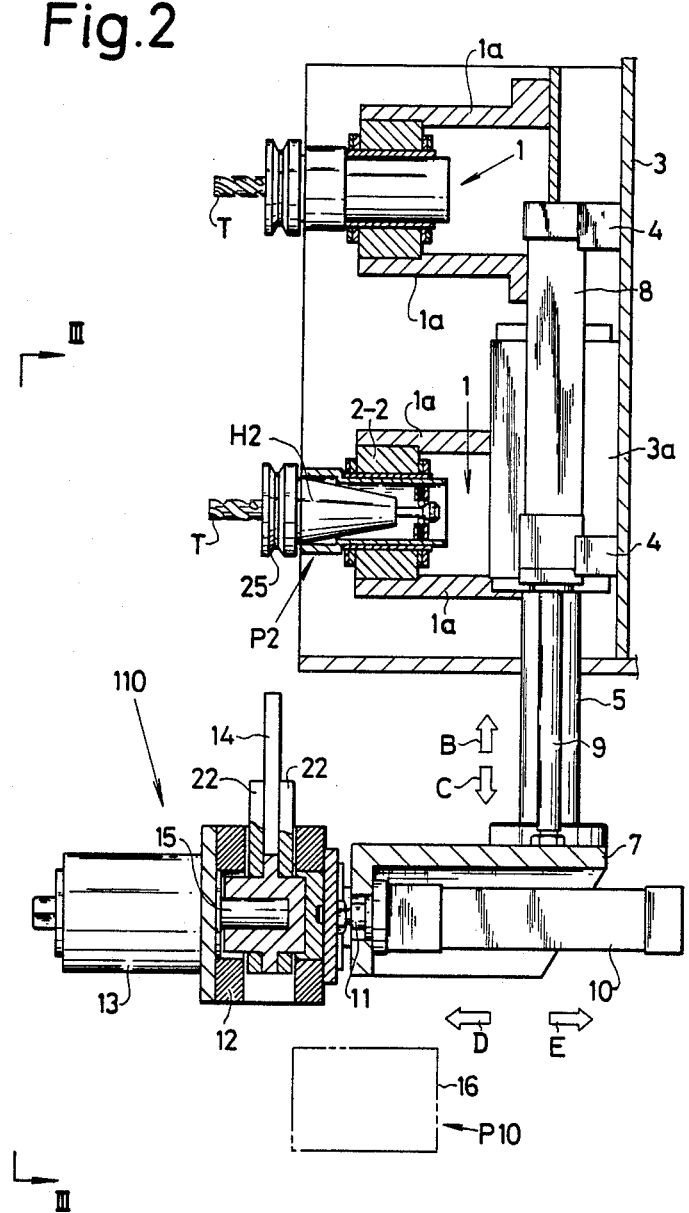
FIG. 2 shows schematically a vertical section of the automatic tool changer shown in FIG. 1.
Figure 3:
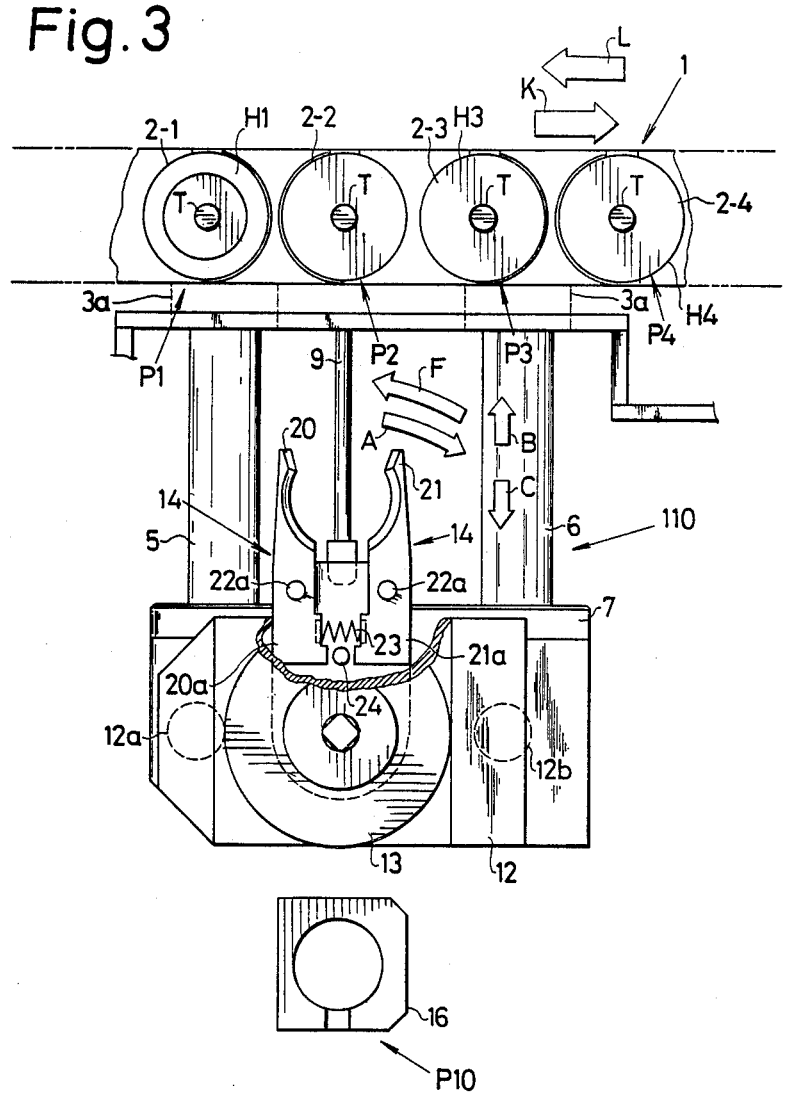
FIG. 3 is a sectional view taken along the line III—III in FIG. 2.

Referring to FIGS. 1 to 3, an automatic tool changer includes an endless type chain 1 equipped with one hundred tool pots 2 (for example, 2-1, 2-2) in which tool holders H are set, respectively, in a fixed address manner. Only a part of the chain 1 is shown. Each of the tool pots 2 has a specific fixed address in the chain 1 while each of the tool holders H has a corresponding specific fixed address. The chain 1 engages plural sprocket wheels (not shown) so as to be driven by a motor (not shown) so that the chain 1 can transfer the tool pots 2 together with the tool holders H in the direction of the arrows K and L in FIG. 3. The chain 1 is housed in a frame 3. The chain 1 is guided along plural guide plates 1a in FIG. 2 when it moves.

In FIG. 3, the tool holders $H_1$–$H_4$ holds different tools T, respectively, and are detachably set in the tool pots 2-1, 2-2, 2-3, 2-4 at the points $P_1$ to $P_4$, respectively. The tool holders H are set in a so-called fixed address manner. That is, each of the tool holders has a specific fixed address and is set in a corresponding specific one of the plural tool pots arranged in the chain 1. In other words, all tool holders are always returned to their original tool pots in the chain 1 after used at a spindle 39. Therefore, the addresses of the tool holders H are not changed or modified during the operation.

The frame 3 is equipped with plural guide members 3a and brackets 4. Two bars 5, 6 are slidably guided along the guide members 3a. A bracket 7 is attached to one end of the bars 5, 6. A hydraulic cylinder unit 8 is fixed to the brackets 4 and has a rod 9 which is fixed at its outer end to the bracket 7. The rod 9 can move in its axial direction, that is, a second direction B and a third direction C.

A hydraulic cylinder unit 10 is fixed to the bracket 7 and has a rod 11 which can move in a fourth direction D and a fifth direction E at a right angle to the directions B, C.

A first changer 110 and its related members will be explained.

FIGS. 2 and 3 show a relationship among the chain 1, the transfer pot 16 and the first changer 110. A rotor base 12 is attached to an end of the rod 11 of the hydraulic cylinder unit 10. Two guided bars 12a, 12b are fixed to the rotor base 12 and slidable along the bracket 7. Incidentally, the guide bars 12a, 12b, 5, 6 are not shown in FIG. 1.

A hydraulic rotor 13 is attached to the rotor base 12. As best shown in FIG. 2, a shaft 15 for the hydraulic rotor 13 is joined to a bracket 22 which can rotate about the shaft 15 in a first direction A and a sixth direction F, for example, within an angle of 180 degrees so that two fingers 14 can swing so as to selectively face toward the tool holder $H_2$ at the point $P_2$ or the transfer pot 16. One finger 14 has a pawl 20 while the other finger 14 has a pawl 21. The fingers 14 are rotatably attached to the bracket 22 through pins 22a. A spring 23 and a stop 24 are disposed between the opposite rear end portions 20a and 21a of the fingers 14.

As the tool holders $H_1$ to $H_4$ are identical, one tool holder $H_2$ will be explained as a typical example. As shown in FIG. 2, a circular groove 25 is formed in one end portion of the tool holder $H_2$ for receiving the pawls 20, 21 of the fingers 14 in such a manner that they can engage each other. The tool holder $H_2$ can be held between the pawls 20 and 22 by means of the spring 23 unless the pawls 20, 21 are forced open.

Figure 4:
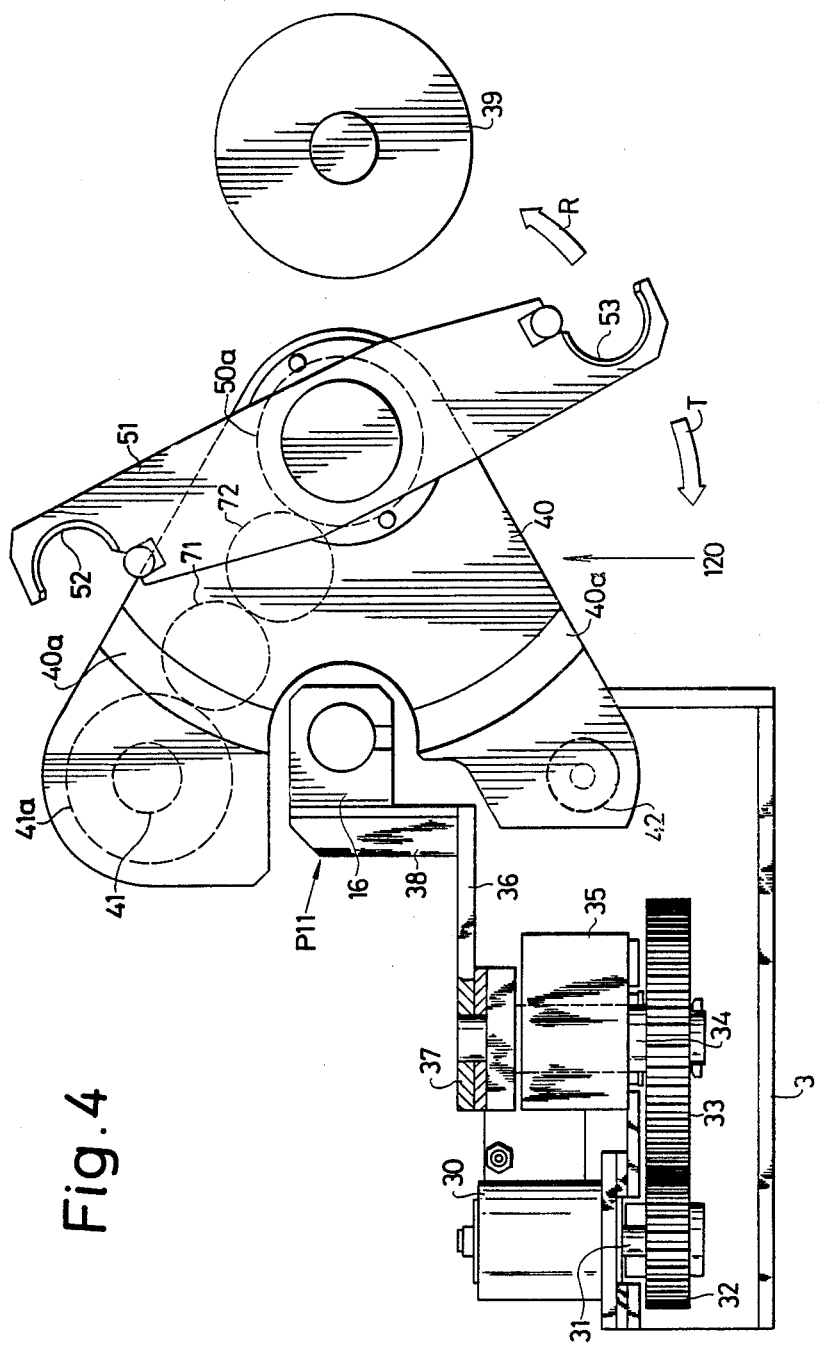
FIG. 4 is a front view of a swing arm and its related members of the automatic tool changer shown in FIG. 1.
Figure 5:
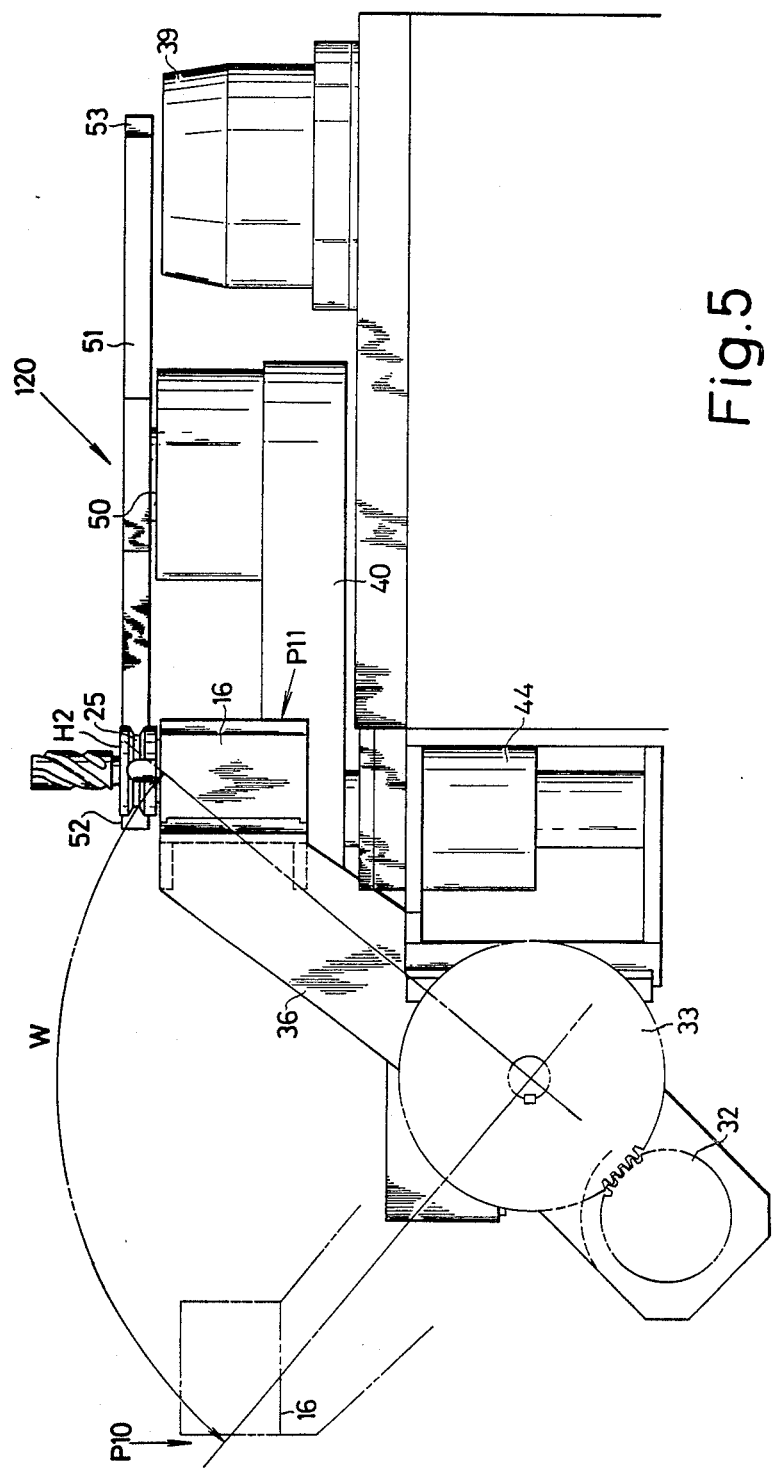
FIG. 5 is a side view of the swing arm and its related members shown in FIG. 4.
Figure 6:
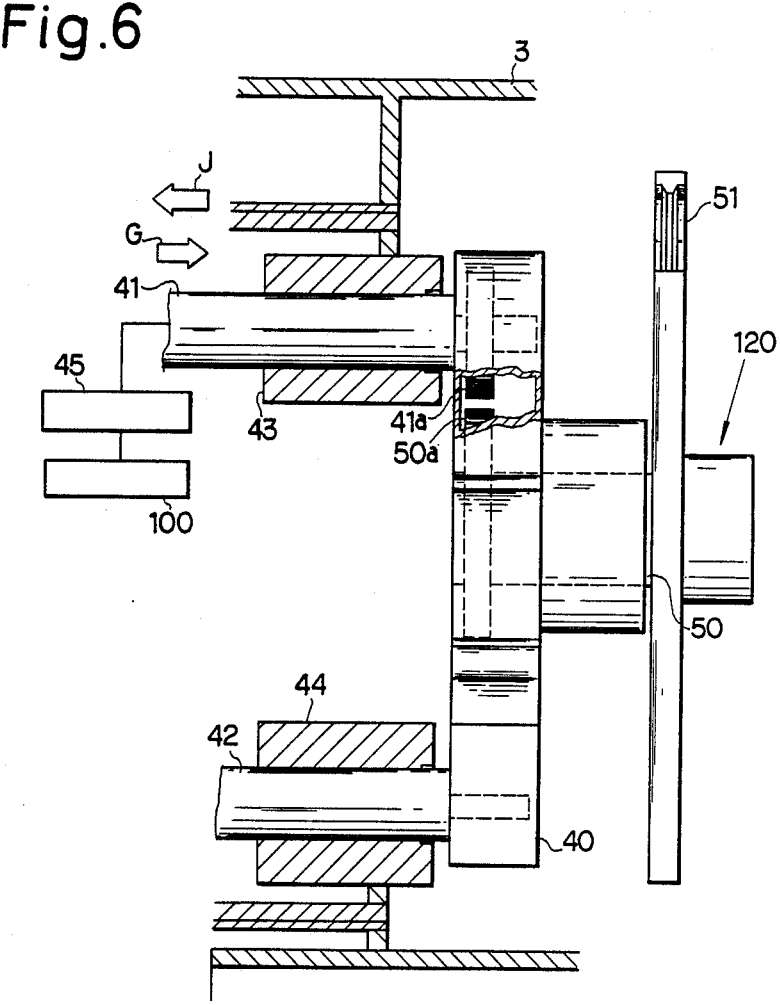
FIG. 6 is a plan view showing, partly in section, the swing arm and its related members shown in FIG. 4.

Referring to FIGS. 4 through 6, a hydraulic rotor 30 is attached to the frame 3. A gear 32 is fixed to a shaft 31 for the hydraulic rotor 30 and engages a gear 33 fixed to one end of a shaft 34. The shaft 34 is rotatably supported by a bearing 35 to the frame 3. One end 37 of an arm 36 is fixed to the other end of the shaft 34. The transfer pot 16 is fixed to the other end 38 of the arm 36.

If the hydraulic rotor 30 rotates in a normal direction, as best shown in FIG. 5, the arm 36 rotates anti-clockwisely by a predetermined angle W so that the tool pot 16 can be set at the point $P_{10}$. The arm 36 can be returned to the point $P_{11}$ when the rotor 30 rotates in a reverse direction.

The axis of the transfer pot 16 positioned at the point $P_{11}$ is in parallel to the axis of the spindle 39.

A second changer 120 will be explained. As shown in FIGS. 4 to 6, a moving block 40 is joined to an outer end of a bar 41 which is slidably guided by a guide portion 43 fixed to the frame 3. A shaft 50 is rotatably supported by the moving block 40. A swing arm 51 is fixed at its intermediate portion to the shaft 50. The moving block 40 is equipped with a guided bar 42 which penetrates through a guide portion 44 fixed to the frame 3 so that the guided bar 42 can be slidably guided thereby when the moving block 40 moves.

The bar 41 can move in its axial direction or the directions G and J so as to shift the moving block 40 in the directions G and J. Also, the bar 41 can rotate about its axis so as to swing the swing arm 51 about the shaft 50. The bar 41 is actuated by an actuating mechanism 45.

Figure 7:
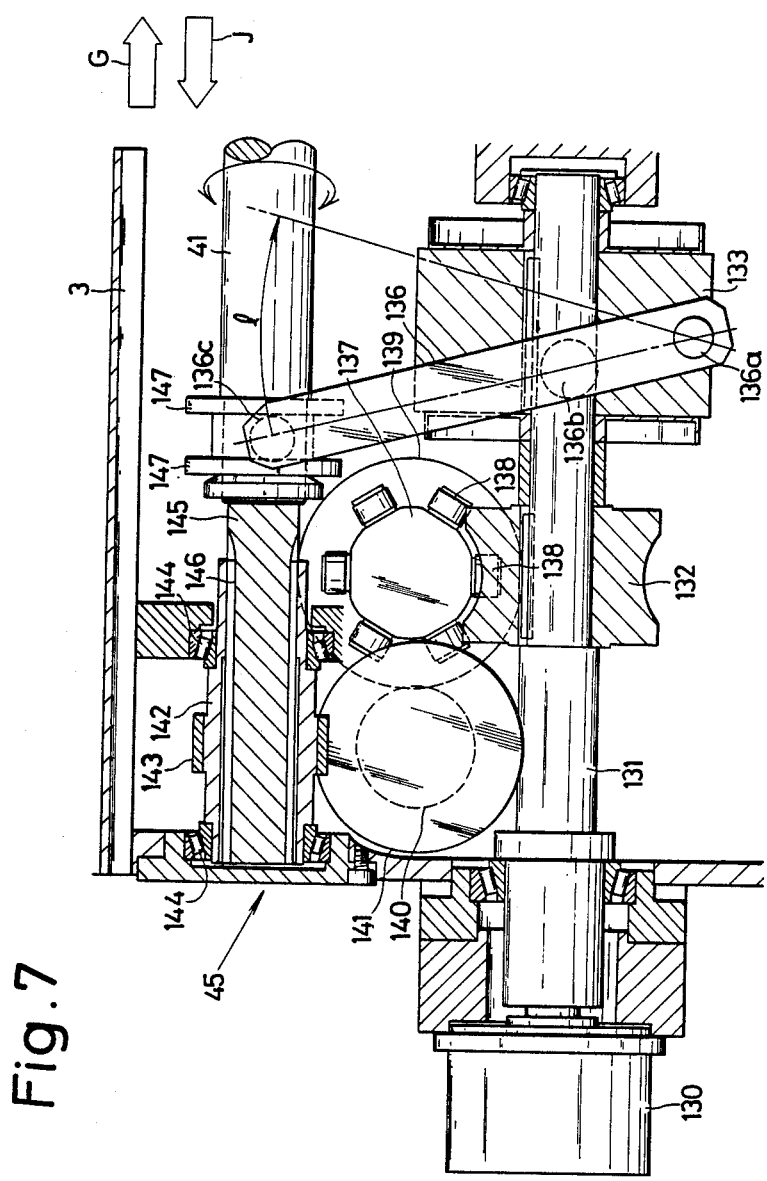
FIG. 7 is a sectional view showing an actuation mechanism of the automatic tool changer shown in FIG. 1.

Referring to FIG. 7, an example of the actuating mechanism 45 will be explained in detail.

Figure 8:
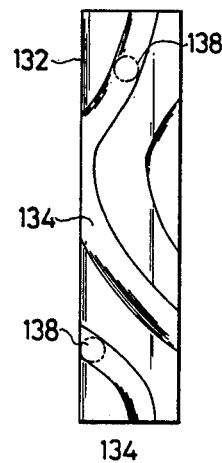
FIGS. 8 and 9 show each development of two cams shown in FIG. 7.
Figure 9:
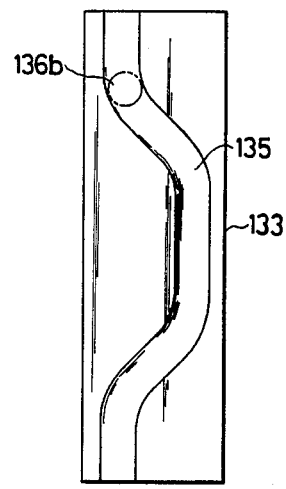

A motor 130 is fixed to the frame 3. A shaft 131 is rotatively supported by the frame 3 in parallel to the bar 41. One end of the shaft 131 is joined to an output shaft of the motor 130. Two cams 132, 133 are fixed to an intermediate portion of the shaft 131 in such a way that they can rotate together. A special groove 134 as shown in FIG. 8 is formed in the cam 132. A special groove 135 as shown in FIG. 9 is formed in the cam 133.

With regard to the cam 133, a lever 136 is secured through a pin 136a to a portion (not shown) of the frame 3 so as to swing about the pin 136a. A cam follower 136b is attached to an intermediate portion of the lever 136. A cam follower 136c is attached to an end of the lever 136. The cam follower 136b is engages the groove 135 of the cam 133 as shown in FIG. 9. When the cam 133 rotates, the cam follower 136b is forced to move intermittently along the axis of the shaft 131 so that the lever 136 swings about the pin 136a.

In respect of the cam 132, a plurality of cam followers 138 are attached to the periphery of a rotor 137 at regular intervals. The rotor 137 is positioned between the shaft 131 and the bar 41. The rotation axis of the rotor 137 is along a line at a right angle to the axis of the shaft 131 or the bar 41. At least one of the cam followers 138 engages always the groove 134 of the cam 132 as shown in FIG. 8. When the cam 132 rotates, the cam followers 138 are forced to move gradually along the axis of the shaft 131 so that the rotor 137 can rotate.

A gear 139 is coaxially fixed to the rotor 137. A gear 140 and a gear 141 are coaxially fixed to a common shaft (not shown) which is in parallel to the rotor 137. The gear 139 engages the gear 140. The gear 141 engages a gear 143 fixed to an intermediate portion of a tubular member 142 which is rotatably supported by plural bearings 144 with respect to the frame 3. The bar 41 has at its inner end a serration portion 145 which is inserted into the tubular member 142. A key 146 is set between the serration portion 145 and the tubular member 142 in such a manner that the rotation of the tubular member 142 can be transmitted to the serration portion 145 and the serration portion 145 can move freely in its axial direction within the tubular member 142. Incidentally, a spline mechanism or any other equivalent means can be used in place of the serration portion 145.

The bar 41 has at its intermediate portion a pair of flanges 147 by which the cam follower 136c is guided in such a way that the bar 41 can freely rotate about its axis and the cam follower 136c can shift the bar 41 in its axial direction when the lever 136 swings.

As shown in FIGS. 4 and 6, the gear 41a fixed to the bar 41 is connected to a gear 50a fixed to the shaft 50 for the swing arm 51. Two idle gears 71, 72 are disposed between the gear 41a and the gear 50a. The bar 41 is joined to the moving block 40 in such a manner that the bar 41 can rotate the gear 41a with respect to the moving block 40 and can shift the moving block 40 in the direction of the arrows G and J.

FIGS. 6 and 7 show that the bar 41 contracts so that the moving block 40 is positioned near the guide members 43, 44.

If the motor 130 starts to rotate according to a signal sent from a CNC unit 100, the shaft 131 rotates. Thus, the two cams 132, 133 rotate. Therefore, the cam follower 136b moves along the groove 135 of the cam 133. As a result, the lever 136 swings about the pin 136a in the direction of the arrow 1 whereby the bar 41 moves in the direction of the arrow G. Consequently, the moving block 40 is shifted by a predetermined distance in the direction of the arrow G. Also, the cam followers 138 move along the groove 134 of the cam 132 so that the rotor 137 rotates. As shown in FIG. 7, this rotation of the rotor 137 is transmitted through the gears 139, 140, 141, 143 and the tubular member 142 to the serration portion 145 so that the bar 41 can rotate about its axis. As shown in FIGS. 4 and 6, this rotation of the bar 41 is transmitted through the gears 41a, 71, 72, 50a and the shaft 50 to the swing arm 51 thereby to swing the swing arm 51 in the direction R or the direction T as shown in FIG. 4.

The swing arm 51 has a first pawl 52 and a second pawl 53 for exchanging a tool holder set in the pot 16 at the point $P_{11}$ and a tool holder set in the spindle 39. The tool holders are held and released by the pawls 52, 53.

An arc-shaped groove 40a is formed in the moving block 40 for guiding each end portion of the tool holders when they are transferred by the swing arm 51.

Referring again to FIG. 1, the hydraulic cylinder unit 8, the hydraulic rotor 13 and other hydraulic means are connected to an oil source 70 through plural hoses. The hydraulic rotor 30 (FIG. 4) is connected to the oil source 70 through a hose. The operation of the oil source 70 is controlled by the CNC unit 100. The hydraulic cylinder unit is preferably of a double action oil hydraulic type.

The operation of transferring a tool holder $H_2$ (FIG. 2) holding a new tool T to the spindle 39 (FIG. 5) will be explained.

First, as shown in FIG. 1, the tool holder $H_2$ is transferred to and placed at the exchange point $P_2$. The fingers 14 face toward the tool holder $H_2$. The rod 9 is in an expanding position in the direction of the arrow C. No tool holder is set in the transfer pot 16.

The rod 11 of the hydraulic cylinder unit 10 contracts in the direction of the arrow E so that the pawls 20, 21 face the groove 25 of the tool holder $H_2$.

The transfer pot 16 moves to the point $P_{10}$ as shown in FIGS. 2, 3 and 5. The swing arm 51 is positioned as shown in FIG. 4 such that the pawls 52, 53 are not near the spindle 39 which has no tool holder.

Referring to FIGS. 1 through 3, the rod 9 moves in the second direction B until the pawls 20, 21 properly engage the groove 25 of the tool holder $H_2$. Next, the rod 11 of the hydraulic cylinder unit 10 extends in the fourth direction D whereby the tool holder $H_2$ is released from the tool pot 2-2 in the fourth direction D. The rod 9 moves in the third direction C so as to transfer the tool holder $H_2$ in the same direction. After that, the hydraulic rotor 13 is actuated so as to rotate the fingers 14 from the position of FIG. 2 in the first direction A by 180 degrees whereby the tool holder $H_2$ moves in front of the transfer pot 16.

When the rod 11 of the hydraulic cylinder unit 10 contracts in the fifth direction E, the tool holder $H_2$ is inserted into the transfer pot 16. If the rod 9 moves in the second direction B, the pawls 20, 21 are disengaged from the tool holder $H_2$. Thus, the tool holder $H_2$ is held in the transfer pot 16.

Referring to FIGS. 4 through 6, the transfer pot 16 which is positioned at the point $P_{10}$ rotates clockwise by the predetermined angle W (FIG. 5) so that the transfer pot 16 moves to the point $P_{11}$. At that time, the bar 41 (FIG. 6) still contracts and does not expand in the direction of the arrow G.

If the motor 130 is actuated, the swing arm 51 swings as above-stated, and then the first pawl 52 (FIG. 4) is engaged into the groove 25 (FIG. 3) of the tool holder $H_2$ set in the pot 16. The second pawl 53 is positioned in front of the spindle 39. Next, the bar 41 moves in the direction of the arrow G (FIG. 6) by means of the actuation mechanism 45 whereby the tool holder $H_2$ is released from the transfer pot 16. After that, the swing arm 52 swings in the direction of the arrow T by 180 degrees so that the tool holder $H_2$ held by the pawl 52 moves in front of the spindle 39. Again the actuation mechanism 45 (FIG. 6) is actuated so as to move the bar 41 in the direction of the arrow J until the tool holder $H_2$ is inserted into the spindle 39. Thereafter, the swing arm 51 swings in the direction of the arrow T in FIG. 4 by a predetermined angle so that the first pawl 52 is disengaged from the tool holder $H_2$. Thus, the tool holder $H_2$ has been set in the spindle 39.

The operation of exchanging a used tool holder $H_2$ for a new tool holder $H_1$ will be explained.

First, the chain 1 is actuated in the direction of the arrow K until the new tool holder $H_1$ moves to the point $P_2$. The new tool holder $H_1$ is transferred from the point $P_1$ to the point $P_2$ like the tool holder $H_2$ and then inserted into the transfer pot 16. At that time, the bar 41 does not move in the direction of the arrow G.

After that, the motor 130 (FIG. 7) is actuated in order to swing the swing arm 51 in the direction of the arrow R in FIG. 4 until the first pawl 52 engages the groove 25 of the tool holder $H_1$ set in the pot 16 while the second pawl 53 engages the groove 25 of the used tool holder $H_2$ set in the spindle 39. The actuation mechanism 45 is actuated so as to move the bar 41 in the direction of the arrow G so that the moving block 40 is shifted whereby the tool holder $H_1$ is withdrawn from the transfer pot 16 while the tool holder $H_2$ is withdrawn from the spindle 39. The swing arm 51 swings in the direction of the arrow T by 180 degrees in FIG. 4 so that the tool holder $H_1$ moves in front of the spindle 39 while the tool holder $H_2$ moves in front of the transfer pot 16. The bar 41 moves in the direction of the arrow J until the tool holder $H_1$ is inserted into the transfer pot 16 while the tool holder $H_1$ is inserted into the spindle 39. Thus, the tool holder $H_1$ has been exchanged for the tool holder $H_2$.

After that, the swing arm 51 swings in the direction of the arrow T by a predetermined angle so that the first pawl 52 is disengaged from the tool holder $H_1$ while the second pawl 53 is disengaged from the tool holder $H_2$.

The tool holder $H_2$ by which the used tool T is held moves from the point $P_{11}$ (FIG. 5) to the point $P_{10}$. At that time, the transfer pot 16 rotates counter-clockwisely through the predetermined angle W.

The transfer pot 16 is positioned near the rotor base 12. The rod 11 of the hydraulic cylinder unit 10 is in a contracted position in the fifth direction E. The rod 9 moves in the second direction B. The fingers 14 face toward the transfer pot 16.

The rod 9 moves in the third direction C. The pawls 20, 21 engage the groove 25 of the tool holder $H_2$ The rod 11 moves in the fourth direction D. The tool holder $H_2$ is withdrawn from the transfer pot 16. The hydraulic rotor 13 is actuated so that the finger 14 rotates in the sixth direction F by 180 degrees thereby to face toward the point $P_2$.

The chain 1 moves in the direction L in FIG. 3. The tool pot 2-2 in which the tool holder $H_2$ is set moves to the point $P_2$. The rod 9 moves in the second direction B until it moves near the tool pot 2-2. The rod 11 of the hydraulic cylinder unit 10 contracts so that the tool holder H$_2$ is inserted into the tool pot 2-2.

After that, the rod 9 moves in the third direction C whereby the tool holder H$_2$ is released from the pawls 20, 21. Thus, the used tool holder H$_2$ has been returned to its original tool pot 2-2.

In the above-stated embodiment, as shown in FIG. 3, the address of the tool pot 2-1 for the tool holder H$_1$ is next to the address of the tool pot 2-2 for the tool holder H$_2$. In this case, an exchange time is relatively short. However, if a certain tool pot 2-X (for example, 2-50) is far from the exchange point P$_2$, then it takes a long time when the tool pot 2-X moves to the exchange point P$_2$.

In order to shorten an effective exchange time, while the previous tool holder is used at the spindle 39, in advance, the next tool holder Hx for the tool pot 2-X can be transferred to the exchange point P$_2$ and then set into the pot 16 by means of the first changer 110. As soon as the tool holder Hx is required to be used, the tool holder Hx is exchanged for the used tool holder by means of the second changer 120.

This invention is not limited to the above-stated embodiments. For example, the fingers 14 can be designed to rotate or swing only in the first direction A by 180 or 360 degrees. A servomotor can be used in place of the hydraulic rotor 30. The transfer pot 16 can be arranged near the spindle 39.

I claim:

1. An automatic tool changer for exchanging a plurality of tool holders for mounting on a machine tool spindle comprising:

transfer means for transferring a selected tool pot of a plurality of tool pots to a first transfer point, each of said tool pots being adapted to receive one of the plurality of tool holders, said plurality of tool holders being set in the tool pots in a fixed address manner so that the tool holders are returned to their original tool pots after use;

holding means, located between said first transfer point and the spindle, for holding one of the tool holders before and after use on the spindle;

a first changer, located between said first transfer point and said holding means, for exchanging a first selected tool holder set in the selected tool pot with a second tool holder held by said holding means and for returning said second tool holder to its original tool pot;

a second changer, located between said holding means and said spindle, for exchanging the selected tool holder held by said holding means for a tool holder mounted on the spindle, said second changer including a swing arm having a plurality of pawls, each of said pawls being adapted to engage and carry one of the tool holders for transfer between said holding means and the spindle, a movable block and a bar and wherein said swing arm is rotatably mounted on said movable block and said movable block is mounted on said bar for rotation relative to said bar; and actuation means, for rotating and axially moving said bar, said actuation means including a first cam for moving said bar axially so as to shift the swing arm linearly and a second cam for rotating said bar about its axis so as to swing said swing arm, whereby said swing arm is rotated and linearly moved.

2. The automatic tool changer of claim 1 wherein said transfer means is a chain.

3. An automatic tool changer for exchanging a plurality of tool holders for mounting on a machine tool spindle comprising:

transfer means for transferring a selected tool pot of a plurality of tool pots to a first point, each of said tool pots being adapted to receive one of the plurality of tool holders, said plurality of tool holders being set in the tool pots in a fixed address manner so that the tool holders are returned to their original tool pots after use;

holding means, located between said first transfer point and the spindle, for holding one of the tool holders before and after use on the spindle;

a first changer, located between said first transfer point and said holding means, for exchanging a first selected tool holder set in the selected tool pot with a second tool holder held by said holding means and for returning said second tool holder to its original tool pot;

a second changer, located between said holding means and said spindle, for exchanging the selected tool holder held by said holding means for a tool holder mounted on the spindle, said second changer comprising a swing arm having a pair of pawls, each of said pawls being adapted to engage and carry one of the tool holders for transfer between said holding means and the spindle; and actuation means, for rotating and linearly moving said swing arm, including a bar on which said swing arm is mounted, said bar being mounted for rotation about its axis and for axial movement, a first cam for linear shifting of said bar and swing arm, a second cam for rotating said bar and swing arm, and a lever interposed between said first cam and said bar so as to convert the rotation of said first cam into linear movement of said bar.

4. The automatic tool changer of claim 1 wherein said transfer means is a chain.

5. An automatic tool changer for exchanging a plurality of tool holders for mounting on a machine tool spindle comprising:

transfer means for transferring a selected tool pot of a plurality of tool pots to a first transfer point, each of said tool pots being adapted to receive one of the plurality of tool holders, said plurality of tool holders being set in the tool pots in a fixed address manner so that the tool holders are returned to their original tool pots after use;

holding means, located between said first transfer point and the spindle, for holding one of the tool holders before and after use on the spindle;

a first changer, located between said first transfer point and said holding means, for exchanging a first selected tool holder set in the selected tool pot with a second tool holder held by said holding means and for returning said second tool holder to its original tool pot;

a second changer, located between said holding means and said spindle, for exchanging the selected tool holder held by said holding means for a tool holder mounted on the spindle, said second changer comprising a swing arm having a pair of pawls, each of said pawls being adapted to engage and carry one of the tool holders for transfer between said holding means and the spindle; and moving said actuation means, for rotating and linearly swing arm, including a bar mounted for rotation about its axis and for axial movement, said swing arm being mounted on said bar, a first cam for linear shifting of said bar and swing arm, a second cam for rotating said bar and swing arm, driving means for rotating said first and second cams, a rotor carrying a plurality of cam followers mounted at regular intervals around its periphery, said second cam engaging said cam followers for rotation of said rotor, a tubular member splined to said bar for free axial movement relative to said bar and gear means for rotatably driving said tubular member and said bar responsive to rotation of said rotor.

6. The automatic tool changer of claim 1 wherein said transfer means is a chain.

7. The automatic tool changer of claim 1 wherein said second changer further comprises a movable block and a bar and wherein said swing arm is rotatably mounted on said movable block, said movable block is mounted on said bar for rotation relative to said bar and wherein said bar is rotatably and axially moved by said actuation means.

8. The automatic tool changer of claim 1 wherein said second changer further comprises a movable block and a bar and wherein said swing arm is rotatably mounted on said movable block, said movable block is mounted on said bar for rotation relative to said bar and wherein said bar is rotatably and axially moved by said actuation means.

* * * * *

UNITED STATES PATENT AND TRADEMARK OFFICE
CERTIFICATE OF CORRECTION

PATENT NO. : 4,799,308

DATED : January 24, 1989

INVENTOR(S) : KITAMURA et al

It is certified that error appears in the above-identified patent and that said Letters Patent is hereby corrected as shown below:

Col. 2, line 54, "holds" should read --hold--.

Col. 6, line 60, after "$H_2$" insert a period --.--.

Col. 8, line 68, delete "moving said".
Col. 9, line 1, after "linearly" insert -- moving said --.

Signed and Sealed this

Twelfth Day of December, 1989

Attest:

JEFFREY M. SAMUELS

*Attesting Officer*   *Acting Commissioner of Patents and Trademarks*